United States Patent [19]
Xia

[11] Patent Number: 6,154,849
[45] Date of Patent: Nov. 28, 2000

[54] METHOD AND APPARATUS FOR RESOURCE DEPENDENCY RELAXATION

[75] Inventor: Chun R. Xia, Mountain View, Calif.

[73] Assignee: Sun Microsystems, Inc., Palo Alto, Calif.

[21] Appl. No.: 09/107,229

[22] Filed: Jun. 30, 1998

[51] Int. Cl.[7] .................................................. G06F 13/00
[52] U.S. Cl. ............................................... 714/4; 709/220
[58] Field of Search .................................. 714/4, 2, 6, 8, 714/25, 26, 31, 36, 39, 41, 42, 47, 48, 57; 709/220, 226, 224, 250

[56] References Cited

U.S. PATENT DOCUMENTS

| | | | |
|---|---|---|---|
| 5,428,745 | 6/1995 | De Bruijn et al. | 395/200 |
| 5,455,932 | 10/1995 | Major et al. | 395/489 |
| 5,561,770 | 10/1996 | De Bruijn et al. | 395/200.06 |
| 5,691,917 | 11/1997 | Harrison | 364/514 B |
| 5,717,934 | 2/1998 | Pitt et al. | 395/750 |
| 5,852,724 | 12/1998 | Glenn, II et al. | 395/200.69 |
| 5,893,083 | 4/1999 | Eshghi et al. | 706/45 |
| 5,958,010 | 9/1999 | Agarwal et al. | 709/224 |
| 5,974,563 | 4/1999 | Beeler, Jr. | 714/5 |
| 6,038,677 | 3/2000 | Lawlor et al. | 714/4 |

OTHER PUBLICATIONS

Article: "Application Transparent Fault Management in Fault Tolerant Mach", Author(s): Mark Russinovich, Zary Segall, Dan Siewiorek, Source(s): Proceedings of the 23rd IEEE Conference of Fault–Tolerant Computer Systems, Computer Systems Center, Department of Electrical and Computer Engineering, Carnegie Mellon University, Pittsburgh, Pennsylvania, Dated: 1993, pp.: 10–17.

Article: "Software Implemented Fault Tolerance: Technologies and Experience", Author(s): Yennun Huang, Chandra Kintala, Source(s): Proceedings of the 23rd IEEE Conference of Fault–Tolerant Computer Systems, AT&T Bell Laboratories, Murray Hill, New Jersey, Dated: 1993, pp.: 2–9.

Article: "Architecture of Fault–Tolerant Computers: An Historical Perspective", Author: Daniel P. Siewiorek, Source(s): Proceedings of the IEEE, vol. 79, No. 12, Dated: Dec. 1991, pp.: 1710–1734.

Article: "High–Availability Computer Systems", Author(s): Jim Gray of Digital Equipment Corp. and Daniel P. Siewiorek of Carnegie Mellon University, Source(s): IEE, Dated: Sep. 1991, pp.: 39–48.

Article: "A Note on Distributed Computing", Author(s): Jim Waldo, Geoff Wyant, Ann Wollrath, San Kendall, Source(s): Sun Microsystems Laboratories, Inc., Mountain View, CA, Dated: Nov. 1994, pp.: 1–13.

Web Page Article: "Patrolwatch Consoles for Windows and for Web Browsers", BMC Console Patrol Product Brief, Digital AlphaServer, BMC Software Patrol, Printed: Jun. 25, 1998, Updated: Apr. 23, 1997, pp.: 1–5, URL:http://wint.decsy.ru/alphaservers/digital/v0000863.htm.

(List continued on next page.)

*Primary Examiner*—Robert W. Beausoliel, Jr.
*Assistant Examiner*—Nadeem Iqbal
*Attorney, Agent, or Firm*—O'Melveny & Myers LLP

[57] ABSTRACT

A method and apparatus that allows flexibility in failure diagnosis, so that a single failure event received by a failure analysis system can affect the availability of different resources in different ways. The described embodiment also allows the dependency between resources to be "relaxed" in certain circumstances. Each failure event in the failure diagnosis system is processed in accordance with dependency logic that describes the strength of the dependencies between various system resources and further determines the precedence if there are multiple dependencies between resources. The dependency logic further determines whether a resource depended on by the current resource is internal or external, e.g., if the resource depended on is inside or outside firewall. The dependency logic also includes a precondition, describing the circumstances in which a dependency between two resources will be found to exist. In addition, the dependency logic includes relaxation rules, which define how a dependency on a particular resource is to be relaxed for a particular current resource.

20 Claims, 7 Drawing Sheets

OTHER PUBLICATIONS

Web Page: "Graphical Tool for System and Database Administration", BMC/Patrol, Strategic Alliances: Partner Directory, Printed: Jun. 25, 1998, p.: 2, URL:http://www-.pyramid.com/solutions/alliances/partner_dir/html/0679.html.

Web Page: "BMC Software", BMC's Patrol, Printed: Jun. 25, 1999, p.: 2, URL:http://www.oracle.com.sg/initiatives/smti/bmc/html/bmc.html.

Web Page: "Monitoring and Diagnostic Products and Vendors", Category: Monitoring and Diagnostic Products, Oracle Business Alliance Programme, Systems Management Tools Initiative, Printed: Jun. 25, 1998, p.: 1, URL:http://www.oracle.com.sg/initiatives/smti/html/monitor.html.

Web Page: "Microsoft "Wolfpack" Clustering Software for Windows NT Server", Printed: Jun. 26, 1998, pp.: 1–5, URL:http://www.telematic.edu.pe/atec/biblio/article/wolfpack.htm.

Web Page: "Clustering and High Availability Guide for IBM Netfinity and IBM PC Servers", Printed: Jun. 26, 1998, pp.: 1–15, URL:http://www.redbooks.ibm.com/SG244858/wolfp004.htm.

Web Page: "Endurance: A New Paradigm for the Lowest Cost Fualt tolerant and Site Disaster Tolerant Solutions for PC Server and Cluster Systems", Printed: Jun. 26, 1998, pp.: 1–16, URL:http://www.nthgencomp.com/endurance.html.

Web Page: "Sun™ Clusters", Category: Software & Networking: Delivering the WebTone, Printed: Jun. 27, 1998, pp.: 1–27, URL:http://wwwwseast2.usec.sun.com/webtone/wp–clusters/.

Web Page: "Sun Debuts New Cluster Systems", Category: News & Events: Press Releases, Printed: Jun. 27, 1998, pp.: 1–6, URL:http://wwwwseast2.usec.sun.com/smi/Press/sunflash/9610/sunflash.961008.1111.

- NORMAL
  THE RESOURCE IS FUNCTIONING NORMALLY. THE RESOURCE IS AVAILABLE.

- DIAGNOSING
  THE RESOURCE IS IN THE PROCESS OF DIAGNOSING AN ABNORMALITY. THE RESOURCE MAY OR MAY NOT BE AVAILABLE.

- ERROR-IGNORED
  THE RESOURCE IS NOT IN THE NORMAL OPERATIONAL STATE BUT THE ERROR CAN BE IGNORED. FOR EXAMPLE, CERTAIN TOLERABLE WORKLOAD PEAKS. THE RESOURCE MAY BE TEMPORALLY UNAVAILABLE.

- FAILING-OVER
  THE RESOURCE HAS MALFUNCTIONED AND IS BEING REPLACED BY A SPARE. THE RESOURCE IS TEMPORARILY UNAVAILABLE.

- REPAIRING
  THE RESOURCE HAS FAILED AND IS BEING AUTOMATICALLY REPAIRED. THE RESOURCE IS TEMPORARILY UNAVAILABLE.

- PERMANENTLY-FAILED
  THE RESOURCE HAS FAILED AND CAN NOT BE AUTOMATICALLY REPAIRED. THE RESOURCE IS UNAVAILABLE UNTIL SOME MANUAL REPAIR WORK IS PERFORMED

| 502 | · EVENT LIST<br>A LIST OF EVENTS BEING PROCESSED BY THIS EVENT HANDLER. |
|---|---|
| 504 | · PRIORITY<br>THE EVENT HANDLING PRIORITY WHEN THE RESOURCE OBJECT SCHEDULES MULTIPLE INCOMING EVENTS INTO DIFFERENT EVENT HANDLERS. |
| 506 | · TYPE<br>ERROR, ALARM, PERFORMANCE, AND ACTION. |
| 508 | · DEPENDENCY LOGIC |
| 510 | · HANDLER RULES<br>RULES TO DEFINE EVENT HANDLING LOGIC. |
| 512 | · CALLBACK HANDLER RULES<br>RULES TO DEFINE CALLBACK EVENT HANDLING LOGIC. |

FIG. 6

EVENT 256

- 602 — TIMESTAMP
  THE TIME WHEN THE EVENT IS CREATED. ALL EVENT SYNCHRONIZATION WITHIN THE ENGINE IS GUARANTEED BY TIMESTAMPS.

- 604 — TYPE
  INTERNAL,
  REQUESTED,
  EXTERNAL,

- 606 — STATUS
  FROM MONITOR: AGED, SPECULATED, CONFIRMED REVOKED.
  ALSO: PENDING, SUCCESS, FAILED

- 608 — CALLBACK SETUP
  INCLUDES CALLBACK EVENT HANDLER, TIMER, AND TIME-OUT THRESHOLD.

- 610 — DATA
  THE RAW DATA OR PROCESSED DATA TO DESCRIBE THE EVENT.

- 702 — DEPENDENT RESOURCE
  THE RESOURCE THAT THE OBJECT IS DEPENDENT ON.

- 704 — TYPE
  STRONG, RELAXED. THE RESOURCE MUST OBEY A STRONG DEPENDENCY WITHOUT NEGOTIATION. HOWEVER, THE RESOURCE MAY CONDITIONALLY RELAX ON THE RELAXED DEPENDENCY.

- 706 — PRECEDENCE
  THE PRIORITY WHEN MULTIPLE DEPENDENCIES MUST BE CONSIDERED.

- 708 — SCOPE
  INTERNAL, EXTERNAL. INTERNAL DEPENDENCIES ARE WELL DEFINED IN THE RESOURCE MODEL, WHILE EXTERNAL DEPENDENCIES ARE NOT WELL DEFINED BECAUSE THE RESOURCE MAY BE OUTSIDE OF THE SYSTEM. (E.G. EXTERNAL FIREWALL)

- 710 — PRECONDITION
  THE CONDITION THAT THE DEPENDENCY IS GRANTED(E.G. PROXY IS ONLY VALID FOR HTTPD WHEN THE WEB SERVER FORWARDS THE REQUEST)

- 712 — RELAXATION RULES
  DEFINES HOW THE DEPENDENCY IS RELAXED.

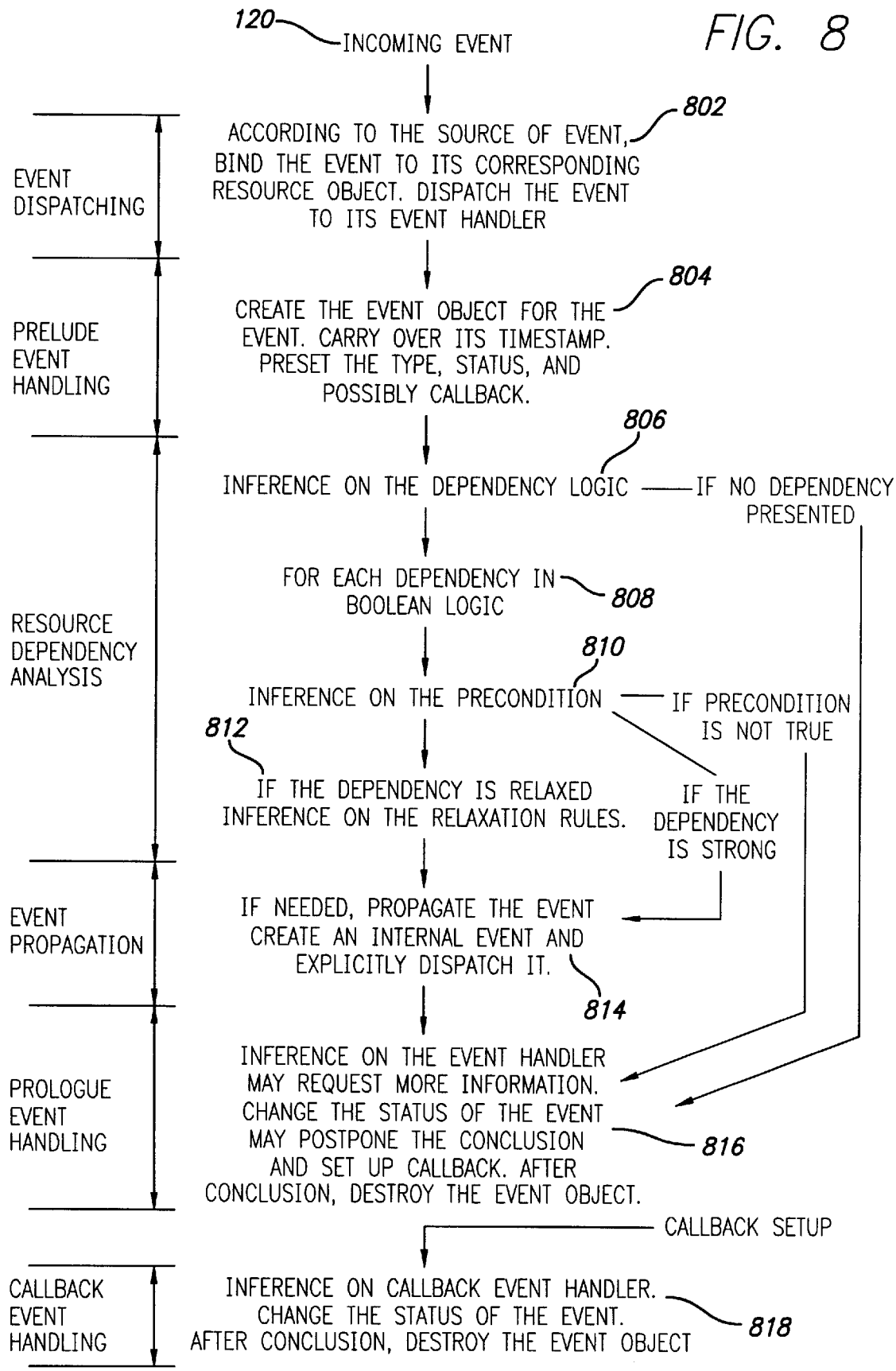

FIG. 9

902 — 508
- DEPENDENT RESOURCE: HTTP DAEMON DEPENDS ON PROXY SERVER (HAS TIMEOUT PARAMETER)
- TYPE: STRONG
- PREDECENCE: HIGHEST
- SCOPE: EXTERNAL
- PRECONDITION: ONLY WHEN WEB SERVER FORWARDS REQUEST
- RELAXATION RULES: N/A

906 — 508
- DEPENDENT RESOURCE: HTTP DAEMON DEPENDS ON OS (HAS TIMEOUT PARAMETER)
- TYPE: STRONG
- PREDECENCE: MEDIUM
- SCOPE: EXTERNAL
- PRECONDITION: NONE
- RELAXATION RULES: N/A

904 — 508
- DEPENDENT RESOURCE: HTTP DAEMON DEPENDS ON DNS SERVER (HAS TIMEOUT PARAMETER)
- TYPE: STRONG
- PREDECENCE: HIGHEST
- SCOPE: INTERNAL
- PRECONDITION: NONE
- RELAXATION RULES: N/A

908 — 508
- DEPENDENT RESOURCE: HTTP DAEMON DEPENDS ON FILE SERVER (HAS TIMEOUT PARAMETER)
- TYPE: RELAXED
- PREDECENCE: LOW
- SCOPE: EXTERNAL
- PRECONDITION: NONE
- RELAXATION RULES: (SEE FIG. 10)

IF WEBSERVER.LOAD > FIFTY PERCENT OF MAXIMUM
  -> INSTRUCT MONITOR TO INCREASE TIMEOUT FOR WEBSERVER

IF ACCESSING USER HAS THE HIGHEST SERVICE LEVEL
  -> INSTRUCT MONITOR TO INCREASE TIMEOUT FOR WEBSERVER BY 100 UNITS

IF ACCESSING USER HAS THE MEDIUM SERVICE LEVEL
  -> INSTRUCT MONITOR TO INCREASE TIMEOUT FOR WEBSERVER BY 10 UNITS

IF POLLED VALUE OF FILESERVER > PREDETERMINED THRESHOLD LEVEL
  -> INSTRUCT MONITOR TO DECREASE TRANSFER RATE OF FILE SERVER

METHOD AND APPARATUS FOR RESOURCE DEPENDENCY RELAXATION

FIELD OF THE INVENTION

This application relates to a method and apparatus for computer network management and, specifically, to a method and apparatus that implements a policy for component failure events in the computer network.

BACKGROUND OF THE INVENTION

Computer networks typically include many components (also called nodes) and many resources associated with those nodes. The term "clustering" refers to a particular kind of computer network system. A cluster is a group of computers (nodes) connected in a way that lets them work as a single, continuously available system. Improved availability of system resources is one of the greatest advantages of clustering. Most resources in a cluster system are supplied redundantly, thus making the resources more available overall. Redundant resources permit the cluster system to continue working whenever one or more components of a cluster, whether hardware or software, fail. When a component failure occurs, the system continues by switching to another, operational component.

In a cluster system (or any large computer network), there are certain to be failures of various resources and components over time. Many computer systems include a model of the system that includes a "dependency graph," which defines which resource depends on which other resources. When serious failure of a resource is detected, the network removes the resource from its model of available resources and makes the resource unavailable to nodes in the network.

If, for example, a client node tries, but is unable to access a World Wide Web server, a resource failure of the web server has occurred. A failure diagnosis procedure then determines whether the failure is serious enough to make the web server unavailable to all other nodes in the network as well as the root cause of the failure. Part of the problem with current failure diagnosis system is due to the existence of "transient failures" in a network. For example, a World Wide Web server may be overloaded and occasionally fail to service requests for certain data. This qualifies as a transient failure, since the Web server is not permanently disabled, but only temporarily overloaded. It would not be a good solution to remove the Web server from service every time it fails to deliver data to a requesting node. On the other hand, if the Web server is consistently failing to deliver data, it is probably desirable to remove the Web server from the network.

Thus, a common problem involved in conventional failure diagnosis lies in whether to take conservative or aggressive action when it is determined that a resource failure has occurred. If a too-conservative approach is used, some total resource failures are missed, reducing overall system efficiency and availability. In contrast, if a too-aggressive approach is used, partial or temporary resource failures are sometimes mis-diagnosed as total failures, again reducing the efficiency and availability of the system.

SUMMARY OF THE INVENTION

A described embodiment of the present invention allows flexibility in failure diagnosis, allowing a single failure event to affect the availability of different resources in different ways, as determined by a series of values and rules associated with each resource. The described embodiment also allows the dependency between resources to be "relaxed" in certain circumstances.

The described embodiment of the present invention is a failure diagnosis system that uses an object-oriented model to determine what action (if any) to take for each "failure event" received by the diagnosis system. A failure event means that an access to a particular resource has failed or been unsuccessful. It should be understood that, if a particular resource fails, the failure may be due to the failure of one or more other resources, upon which the resource that initially failed depends. Such a failure is called a "partial failure."

The model includes a "system resource object" for each system resource in the network. Each system resource object keeps a list of incoming "failure events" for that resource (for example, when a node has tried and failed to access the resource) and a list of "resource dependencies," which details, for the current resource, which other resources in the system depend on the current resource.

The dependency logic associated with each resource object allows the event handler flexibility in diagnosing and handling resource failures. In the described embodiment, the dependency logic in each resource object describes the strength of the dependencies between the resource and various other system resources and further determines the precedence of dependencies if there are multiple dependencies between resources. The dependency logic further determines whether a resource depended on by the current resource is internal or external, e.g., if the resource depended on is inside or outside the firewall. The dependency logic also includes a precondition, describing the circumstances in which a dependency between two resources will be found to exist. In addition, the dependency logic includes relaxation rules, which define how a dependency on a particular resource is to be relaxed for a particular current resource.

In the described embodiment, each resource object in the model has a status value associated with it. A status value of a resource can be: normal, diagnosing, error-ignored, failing over, repairing, or permanently failed. Thus, the model keeps track of the current status of each resource. As each resource event is received and processed, the failure diagnosis system constantly determines whether to adjust the status of the affected resource object or objects. For example, if the system receives an event of a single failure to reference a Web server, the system determines whether this failure should alter the default, normal state of the resource. The present invention allows a good deal of flexibility in this decision.

In the described model, each resource object also has an associated "event handler" for each type of failure event that might be received for the resource object. Each event handler includes a list of pending failure events for its resource. Each event handler further includes at least: 1) a priority value, which schedules multiple incoming events into different event handlers; 2) a type of event handled by the event handler ( (which preferably include error events, alarm events, performance events, and action events; 3) dependency logic, which details which resources the current resource depends on; and 4) handler rules, which define the actions of the event handler.

In accordance with the purpose of the invention, as embodied and broadly described herein, the invention relates to a method of implementing a policy dealing with resource failure in a computer network, comprising the steps performed by a data processing system of: receiving a failure event corresponding to a failure of a first network resource; determining a second network resource that has a dependency relationship with the first network resource; if the dependency relationship between the first and the second network resource is a relaxed dependency relationship, performing actions determined by a plurality of relaxation rules for the first and second network resources; and perform actions determined by a plurality of event handler rules for the failure event.

A fuller understanding of the invention will become apparent and appreciated by referring to the following description and claims taken in conjunction with the accompanying drawings.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 3 is an example of a resource dependency graph for resources in a network.

FIG. 4 shows exemplary status values belonging to a resource object of FIG. 2.

FIG. 5 shows example properties of an "event handler" of FIG. 2.

FIG. 6 shows example properties of an "event" of FIG. 2.

FIG. 7 shows an exemplary format of dependency logic in the event handler format of FIG. 5.

FIG. 8 is a flow diagram showing steps performed by the failure diagnosis system when it receives a failure event for a particular resource.

FIG. 9 shows an example of values in a plurality of dependency objects for a software resource of FIG. 2.

FIG. 10 shows an example of relaxation rules for a particular type of event for a particular resource.

DETAILED DESCRIPTION OF PREFERRED EMBODIMENTS

I. General Discussion

Figure 1:
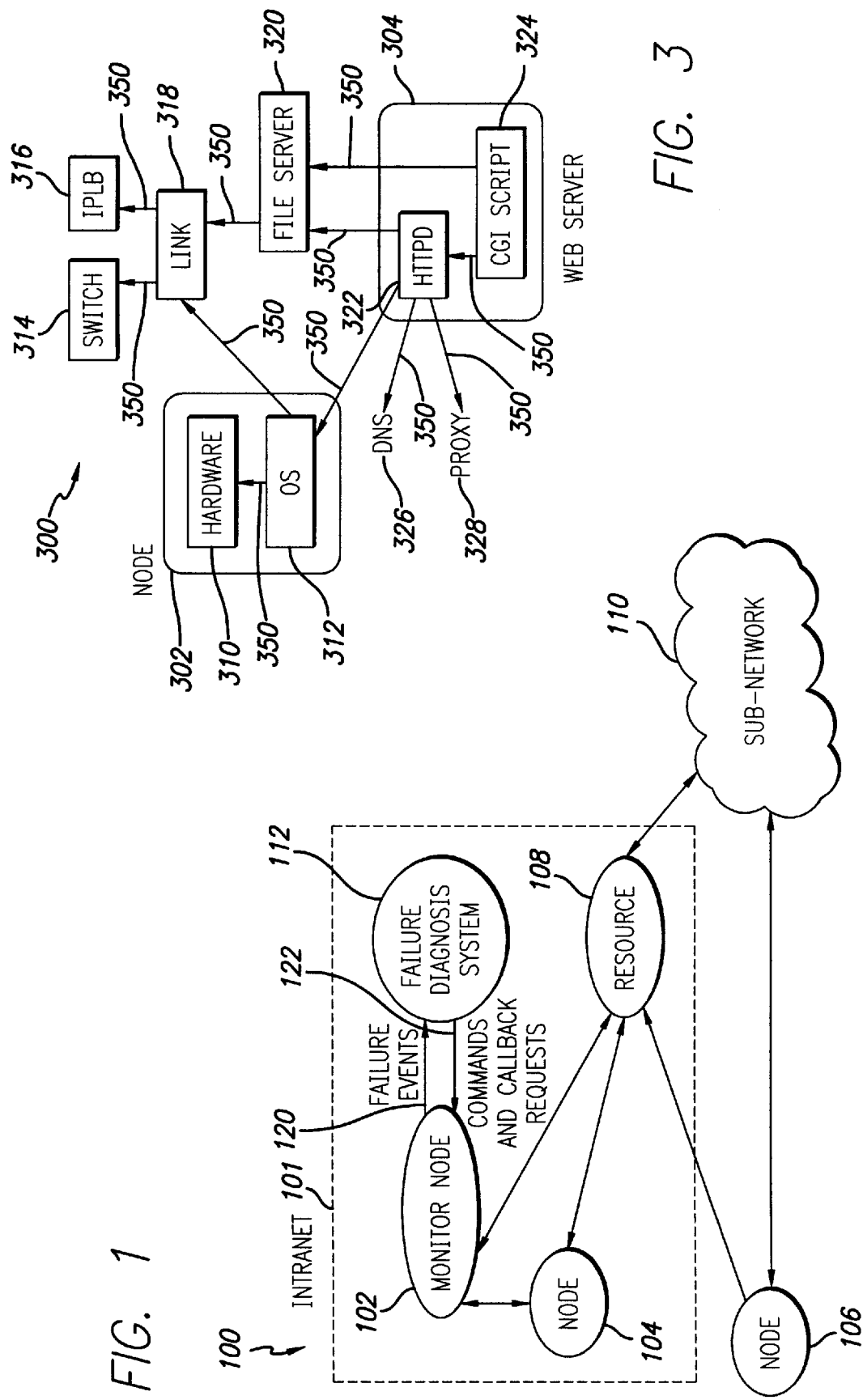
FIG. 1 is a block diagram of a computer network, including a failure diagnosis system, in accordance with one embodiment of the present invention.

FIG. 1 is a block diagram of an exemplary computer network 100, including a failure diagnosis system, in accordance with one embodiment of the present invention. FIG. 1 includes an intranet 101, which includes a node 104, a monitor node 102, a failure diagnosis system 112, and a resource (which can be hardware or software) 108. Network 100 also includes another node 106 and a subnetwork, such as the internet or another network or sub network. It will be understood that FIG. 1 is provided by way of example only and that failure diagnosis system 112 could be included in any appropriate computer network, including, but not limited to a cluster network.

In FIG. 1, failure diagnosis system 112 receives "failure events" 120 from monitor node 102. (An exemplary format of a failure event is discussed below in connection with FIG. 6.) Failure diagnosis system sends commands and callback requests 122 to monitor node 102, as described in further detail below in connection with FIG. 8. Monitor node 102 generally monitors the state of the network. Monitor node may, for example, poll various resources to determine whether they are operational. While the exact operation of monitor node 102 can vary in different networks, it generally monitors the health of all or part of the network 100 and communicates suspected failures to failure diagnosis system 112.

Figure 2:
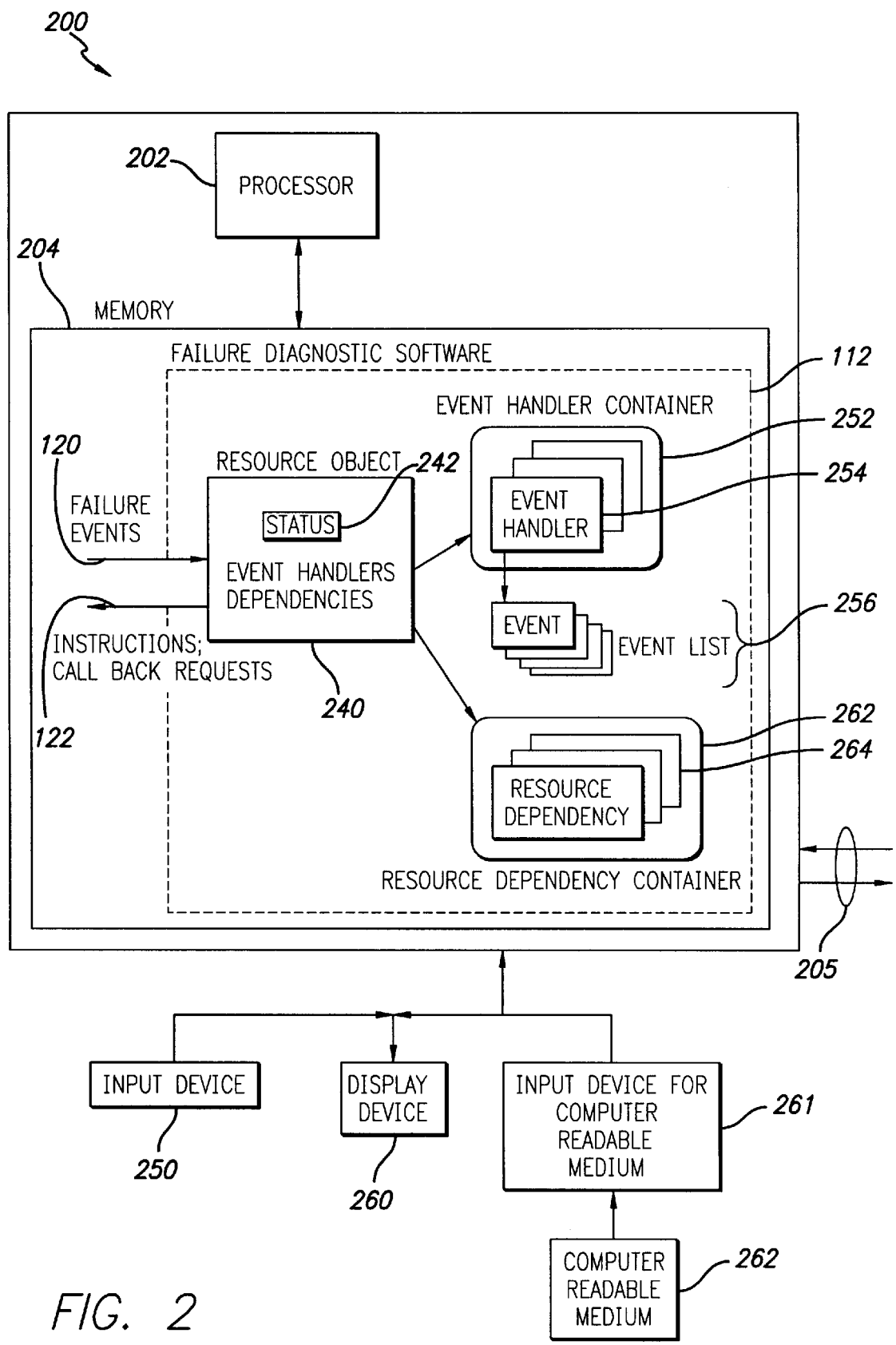
FIG. 2 is a block diagram of a data processing system incorporating the failure diagnosis system.

FIG. 2 is a block diagram of an exemplary data processing system 200 on which failure diagnosis system 112 is implemented. Data processing system 200 includes a processor 202 and a data storage area (e.g., a memory) 204. Data storage area 204 includes certain well-known types of information, such as operating systems, objects, and data structures. Storage area 204 also includes failure diagnosis software 112. Storage area 104 preferably also includes software (not shown) for communicating with a network, such as a LAN, WAN, intranet, or the internet.

In the described embodiment, failure diagnosis software 112 is implemented using an object-oriented methodology and includes a plurality of resource objects 240 (one for each system resource). Each resource object 240 has an associated resource status value 242. Each resource object 240 also has an associated event handler container 252 and an associated resource dependency container 262. Each event handler container 252 includes a plurality of event handlers 254 (one for each type of event that can be received for the resource). Each event handler 254 has an associated event list containing a plurality of received failure events 256. An exemplary event handler is described below in connection with FIG. 5. Actions performed by an exemplary event handler are described below in connection with FIG. 8. An exemplary format of an event is described below in connection with FIG. 6.

Each resource dependency container 262 includes a plurality of resource dependencies 264 (one for resource with which the current resource has a dependency relationship). An exemplary format of a resource dependency is described below in connection with FIGS. 7 and 9.

A person of ordinary skill in the art will understand that system 200 may also contain additional elements, such as input/output lines; input devices, such as a keyboard, a mouse, and a voice input device; and display devices, such as a display terminal. System 200 may also include a computer readable input device 250, such as a floppy disk drive, CD ROM reader, or DVD reader, that reads computer instructions stored on a computer readable medium 260, such as a floppy disk, a CD ROM, or a DVD disk. System 100 also may include application programs, operating systems, data, etc., which are not shown in the figure for the sake of clarity.

In the following discussion, it will be understood that the steps of methods and flow charts herein discussed herein can be performed by processor 202 (or another appropriate processor) executing instructions stored in storage area 204 (or other appropriate memories or storage areas). It will also be understood that the invention is not limited to any particular implementation or programming technique and that the invention may be implemented using any appropriate techniques for implementing the functionality described herein. The invention is not limited to any particular programming language or operating system.

The instructions in storage area 104 may be read into storage area 104 from a computer-readable medium. Execution of sequences of instructions contained in main memory causes one of the processors to perform the process steps described herein. In alternative embodiments, hard-wired circuitry may be used in place of or in combination with software instructions to implement the invention. Thus, embodiment of the invention are not limited to any specific combination of hardware circuitry and software.

The term "computer-readable medium" as used herein refers to any medium that participates in providing instructions to a processor for execution, including but not limited to, non-volatile media, volatile media, and transmission media. Instructions can also be loaded into storage 204 via a carrier wave over a network, such as the a LAN, WAN, an intranet, the internet, etc.

II. Detailed Description

FIG. 3 is an example of a resource dependency graph 300 for resources in a exemplary network. The relationships in dependency graph 300 are generally reflected in resource dependencies 264 of FIG. 2. In the example, a node 302 includes two resources: hardware 310 and an operating system (OS) 312. A Web server node 304 includes software implementing an http daemon (httpd) 322 and software implementing a CGI script (CGI) 324. The network also includes switch 314, a load balancer (IPLB) 316, a link 318, a file server 320, a name server (DNS) 326, and a proxy server (proxy) 328. As shown in the Figure, http daemon 322 has a dependency relationship with proxy server 328, name server 326, operating system 312, and file server 320. Other dependency relationships are also shown by way of example.

The following examples provide exemplary formats used in one implementation of the present invention. These formats are provided by way of example and are not to be interpreted as limiting the present invention. FIG. 4 shows exemplary status values 242 that can belong to a resource object 240. FIGS. 5–7 shows exemplary data formats. FIG. 8 shows exemplary actions performed by an event handler 254 when a filler event is received. FIG. 9 shows exemplary values reflecting the dependency relationships for http daemon 322 of FIG. 3.

As shown in FIG. 4, each resource 242 has a status value 242 of: normal, diagnosing, error-ignored, failing-over, repairing, or permanently failed. These values reflect a current status of the resource and are set or changed by the event handlers 254 of failure diagnosing system 112 during its operation.

A status of normal means that the resource is functioning normally and that the resource is available. A status of diagnosing means that the resource is in the process of being diagnosed by the failure diagnosing system 112 and that the resource may or may not be available. A status value of error-ignored means that the resource is not in a normal operating state, but that the error can be ignored. (For example, a Web server resource might be placed in error-ignored status if the diagnosis system 112 determines that the Web server is dropping requests due to a workload peak.) A status of failing-over means that the resource has malfunctioned, is currently unavailable, and is being replaced by a spare. A status of repairing means that the resource has failed, that the resource is temporarily unavailable, and is being automatically repaired. A status of permanently-failed means that the resource has failed, is unavailable, and cannot be automatically repaired. It will be understood that the above status values are exemplary only and that any appropriate status values can be used to implement the present invention.

FIG. 5 shows example properties of an "event handler" 254 of FIG. 2. Each event handler 254 receives failure events 120 and handles these events as indicated by its handler rules 510. FIG. 8, discussed below, provides a flow chart showing an example of how an exemplary event handler handles received failure events 120. Each event handler 254 also includes an event list, which queues failure events being handled by the event handler; a priority rule, which prioritizes different types of incoming events 120 to different event handlers 254; a type 506 of the events handled by this event handler. Each event handler also includes dependency logic 508, which is discussed below in connection with FIGS. 7 and 9. Each event handler also includes callback handler rules 512, which define event handling logic for callback events.

FIG. 6 shows example properties of a received failure event 120. Each event 120 includes a timestamp 602, an event type 604, an event status 606, an event callback setup 608, and event data 610. Timestamp 602 reflects the time that the event was created. Type 604 can have a value of: External, Requested, or Internal. An external event is generated, for example, form monitor node 102 of FIG. 1. For example, monitor node 102 may have polled a particular resource and determined that the resource is not operating correctly. In this case. Monitor node 120 sends an failure event 120 of type External to failure diagnosis system 112. It will be understood that various implementations of the present invention may use different or other external sources than monitor node 102 to generate external failure events 120.

A requested failure event is a failure event resulting from a request from failure analysis system 112 to an external node such as monitor node 102. For example, if failure system 112 thinks that a certain type of failure has occurred for a resource, but needs more information to confirm the diagnosis, it may sends a request to an external node (such as monitor node 102) requesting that the external node perform further tests. The result of this test if returned to failure diagnosis system 112 is a failure event having type Requested.

An internal failure event is generated by failure analysis system 112 itself and queued for later processing. For example, in the case of a Web server that fails to respond a first time, failure analysis system 112 may assign the Web server resource a status 242 of "diagnosing" and send an internal failure event 120 so that the status of the Web server will be re-evaluated at a later time. The described embodiment assigns a status 608 to each event 256. Possible values of status 606 include aged (if the event has been pending for a certain amount of time), speculated (if the event indicates that a resource may be unavailable), confirmed (if the event indicates that the resource is unavailable), revoked (if the event should be ignored or rejected). In the described embodiment, events from an action monitor (not shown) have a status of pending, successful, or failed. When an action is dispatched to the action monitor, the system 112 will track the commitment of the action. When the system 112 receives the acknowledgment from the action monitor, the action is confirmed in the system 112 and then logged. For certain actions, such as node failover, the monitor 102 is also notified. If the action fails, the system 112 will start diagnosis of the action failure, which may result in a new policy decision and new actions.

III. Dependency Logic

FIG. 7 shows an exemplary format of dependency logic in the event handler format of FIG. 5. FIG. 7 is important, since it defines the dependency relationships between resources in the network, such as the dependency relationships shown in FIG. 3. Each resource in the network will have one or more instances of dependency logic, describing the dependency relationship of that resource to other resources in the network.

Each instance of dependency logic 508 includes a dependent resource 702. For example, FIG. 9 shows four instances of dependency logic 508 for the http daemon 322 of FIG. 3. A first instance 902 of the data dependency logic 508 shows that http daemon 322 depends on proxy server 328. A second instance 904 of the data dependency logic 508 shows that http daemon 322 depends on DNS server 326. A third instance 906 of the data dependency logic 508 shows that http daemon 322 depends on operating system 312. A fourth instance 908 of the data dependency logic 508 shows that http daemon 322 depends on file server 320.

Each instance of dependency logic 508 includes a dependency type 704, which indicates whether the dependent relationship is a strong type or a relaxed type. A strong dependency cannot be relaxed. A relaxed dependency can be relaxed in accordance with relaxation rules 712. In the example of FIG. 9, first instance 902 of the data dependency logic 508 represents a strong dependency. Thus, for example, if the resource depended on is not available, the resource that depends on it is also not available. In the example of FIG. 9, the dependency between the http daemon 322 and proxy server 328 cannot be relaxed. In contrast, fourth instance 908 represents a relaxed dependency, and can be relaxed in accordance with the relaxation rules 510 in the instance 908. An example of relaxation rules are shown in FIG. 10.

Each instance of dependency logic 508 includes a precedence 706, which indicates a priority when multiple resource dependencies exist for a particular resource. In the example of FIG. 9, instances 902 and 904 have a highest priority and will be considered before instances 906 and 908.

Each instance of dependency logic 508 includes a scope 708, which can have a value of internal or external. An internal scope indicates that the resource depended upon is internal to a subsystem (such as intranet 101 of FIG. 1). Thus, for example, in the example of FIG. 9, instance 902 indicates that proxy server 328 is external to the system containing http daemon 322. In contrast, as shown by instance 904, the DNS server 326 is an internal resource. In general, diagnosis system 112 will be able to determine more information about resources internal to its own subsystem (such as intranet 101). Thus, the system 112 may treat internal and external resources differently.

Each instance of dependency logic 508 includes a precondition 710, which defines the conditions under which the defined dependency exists. For example, in the example of FIG. 9, instance 908 defines that a dependency relationship exists between http daemon 322 and proxy server 328 only when the failure results from the http daemon forwarding a request from the Web server 304. If this condition is not true, no dependency relationship exists between the http daemon and the proxy server. Thus, precondition 710 allows dependency relationships to by predicated on, for example, previous occurrences in the system.

Each instance of dependency logic 508 includes relaxation rules 712. These relaxation rules are defined only for those instances of dependency logic 508 that have a type 704 of "relaxed." If the dependency relationship is relaxed, relaxation rules define the specific manner and circumstances in which the dependency can be relaxed. In the example of FIG. 9, if the access to file server 320 is a first failure, the dependency is ignored. Subsequent failures are treated differently.

FIG. 10 shows additional examples of relaxation rules 712 for a particular resource. The example is a set of relaxation rules for fileserver 320 when a failure event occurs due to inability to access the file server. It will be understood that the precise format and syntax of relaxation rules may vary for different implementations of the present invention. In general, relaxation rules have a predicate part (which evaluates to TRUE or FALSE) and an action part which defines an action to be taken if the predicate is TRUE.

In the example shown, in a first rule, when a current load of the fileserver is greater than or equal to a median load, failure diagnosis system 112 sends an instruction to monitor node 102 to instruct the monitor node to increase the timeout of the server node. In the example, each resource dependency has an associated timeout. In the described embodiment, the timeout value is stored in the monitor and used to determine when a monitor polling action of the resource has waited long enough to timeout. In yet another embodiment, the timeout value is stored in the system 112 and used to determine whether a resource has timed out, either in response to polling by the system 112 or in response to received events. This is quite different from other static resource dependencies. The relaxation rules adjust the timeout parameters dynamically so that the fragile dependency is adaptive to the workload, thus eliminating partial failures.

In the example, Web server 304 has an http daemon 322. A user requests the web server for a web page containing text and a video clip. Under normal workload, two daemons serve for the two http GET requests and respond within the time-out threshold. However, when the server is under heavy load, the http daemon 322 fetching the video clip may not respond and eventually time out, but another http daemon (not shown) sends the text timely, since it is buffer cached. The user will observe the partial failures scenario because he receives text successfully, but does not receive the video clip. In this particular case, the slowdown of the server is monitored. Since the web server depends on the server with timeout parameter, the failure diagnosis system 112 prevents the partial failure by increasing the timeout of http daemons. If the web server appears a permanent failure, adjustment of the timeout parameters in this latency dependency will not help. The event handler rules will realize that the web server has suffered a permanent failure.

The second and third rules of the example occur in a system where various users have different guaranteed levels of service. In the example shown, in a second rule, when a user whose access failed has a highest access level, the monitor is instructed to decrease the timeout value by a large amount so that the fast service is guaranteed. In the example shown, in a third rule, when a user whose access failed has a medium access level, the monitor is instructed to decrease the timeout value by a medium amount.

FIG. 10 also shows an example relaxation rule that says that if the requested file is a video stream, the monitor is instructed to increase the dependency timeout for the fileserver by 50 units. Thus, the dependency is relaxed between the Web server and the file server when the file being accessed is a video file, since video files tend to be large files that increase the load on the server.

FIG. 10 also shows an example of a relaxation rule that says that if the file server 320 (upon which the Web server 304 depends) is too slow, the monitor should decrease the threshold of the file server throughput (thus decreasing the transfer rate). Because it is possible that the slowness of the server is probably due to a peak load, it is not desirable to take the web server out of service, instead the action specified by the dependency relaxation rule will allow the web server to recover from its peak load and resume more a more normal response time to the web server. At this time, the threshold can be increased bit by bit, if desired.

It should be noted that the actions in the relaxation rules discussed herein are exemplary and are not to be taken in a limiting sense. The exemplary actions shown adjust dependency timeout and a threshold value. It should be understood that other types of actions affecting these or other parameters in the system can be included in other relaxation rules, as long as the actions serve to relax the dependency between resources.

IV. Diagnosing a Failure Event

FIG. 8 is a flow diagram showing steps performed by the failure diagnosis system when it receives a failure event for a particular resource. In the described embodiment, the steps of FIG. 8 are defined by handler rules 510 of FIG. 5, although they could also be hard-coded into each event handler. The steps of FIG. 8 are performed for each failure event 120 received by failure diagnosis system 112, whether the event is received from an external source (such as monitor node 102) or from an internal source (such as failure diagnosis system 112 itself).

Step 802 receives a failure event 120 and binds the event 120 to a resource object 240 corresponding to the failed resource specified by the event (this information is preferably part of data field 610). The event is dispatched to the event handler for the type 604 of the event. Step 804 creates the event object 256 for the event, copying the timestamp, type, and status from the received event 120 and setting up a callback. In the described embodiment, a received event 120 has a format similar to the format shown in FIG. 6. The data in an event 120 can be, for example, a series of attribute value pairs, containing information about the event. Example of attribute value pairs are <response time: 30 milliseconds> or <response time: timeout occurred>.

Steps 806 through 814 perform "inference" on dependency logic 508 for the event. Steps 816 and 818 perform "inference" on event handler rules 510, while step 818 performs "inference" on callback handler rules 512. The term "inference" is a term known to persons of ordinary skill in the art of rule-based systems. To perform inference is to perform actions based on a set of rules. Thus, for example, if the predicate of a rule in the rule set is true, an action associated with the predicate is performed.

Steps 808 through 814 form a loop that is performed for each dependency logic instance 508 for the failed resource. In the example of FIG. 9, http daemon 322 depends on each of proxy server 328, DNS server 326, OS 312, and fileserver 320. It is also possible for a resource to depend on other resources using an OR Boolean logic, where a resource depends on some but not all of another group of resources. Because, here, all of the other four resources must be working for http daemon 322 to work, steps 808 through 814 would be performed for each of instances 902, 904, 906, and 908 when a failure event 120 is received for http daemon 322.

Step 815 propagates the failure event. This means that the event handler creates an internal failure event for each resource upon which the current resource depends. Thus, if the http daemon 322 fails, it may be due to one or more of the four resources upon which it depends. The failure diagnosis system 112 creates the new failure events and processes them in turn to determine whether additional failures have occurred. The described embodiment creates events of the type requested.

Step 816 performs inference on the event handler rules 510. In general, the event handler rules determine whether or not to change the status 242 of the resource. The event handler rules may also determine that the resource should be made unavailable to the system. Step 818 performs inference 512. If the system 112 has previously sent an instruction having a callback, the callback rules handle the callback event when it occurs.

V. Event Correlation and Filtering

Two resources are independent if a dependency cannot be inferred from the dependency rules. Obviously, failures of independent resources have no impact on each other. Once the resource dependency is established, some failure events can be correlated. For example, the monitor 102 sends an event indicating that the Web server is down. Meanwhile, another event indicates that the stable storage is not reachable. These two events can be correlated because the Web server depends on the stable storage. The correct action is to fix the problem associated with the stable storage. The event of the Web server failure should be ignored. Therefore, the event correlation can filter out some events as the impact of a failure on a dependent resource.

The event correlation must be time coalesced to prevent event aging. The time coalescing method is as follows: Each event is assigned an observation time window. If the two events have dependency defined in the resource dependency, and the two observation time windows overlap, the two events are determined as correlated. The size of the observation time window is selected according to experimental data (or can be self-adaptive, given an appropriate and reliable method). Event correlation is applicable to all types of failures, including hardware and software failures, permanent and transient failures, and total and partial failures.

Hardware failures occur in physical resources including nodes and links. Software failures occur in both physical and logical resources. An OS failure is a software failure in a physical node. An http daemon failure is a software failure in a logical web service resource. Usually, an event generated by a monitor 102 indicates the associated resource as data in the event. The type of the resource can identify whether it is hardware or software.

The following heuristic methods are preferably used to reduce the cost of diagnosing failures:

1) Monitoring the failure duration and the performance pattern. The failure events along with the performance data can be time correlated with "temporal interference." For time correlation, the system 112 may request the monitor 102 to probe within a certain time interval. On one hand, a threshold of tolerable duration for the failures is used to decide that the failure is considered as permanent (combined with the next two steps). On the other hand, the performance pattern in this interval is analyzed. The system 112 preferably requests the monitor 102 to provide the most recent historic performance pattern. If the performance degradation is gradually and spanning in a certain interval threshold, the failure is considered as transient. Otherwise, there is a disruption in the performance degradation. The failure is thus considered permanent. Some of the performance patterns are pre-analyzed within the monitor 102. For example, the system overload pattern can be characterized into a workload curve of throughout versus response time.

2) Checking the system load during the previous step may accelerate the transient failure detection. The system load information can be obtained from a load-balancing component of the system 112. A failure under load stress is likely to be transient. Therefore, the system health problem can be quickly diagnosed as a load balance problem as opposed to a permanent system failure.

3) Determining the failure resource type. The resource of the failure can be deducted through event correlation or explicit requests to the monitors based on the resource dependency. According to failure profiles from experiments and field operations, the failures on some resources may expose a higher probability of transient failure or of permanent failure. However, this information may be fragile because the statistics may be quite workload dependent. Therefore, in the heuristic diagnosis, this is the last and the least important step for the acceleration of transient failure detection.

In summary, the described embodiment allows flexibility in failure diagnosis, so that a single failure event received by a failure analysis system can affect the availability of different resources in different ways. The described embodiment also allows the dependency between resources to be "relaxed" in certain circumstances. Each failure event is the failure diagnosis system is processed in accordance with dependency logic that describes the strength of the dependencies between various system resources and further determines the precedence if there are multiple dependencies between resources. The dependency logic further determines whether a resource depended on by the current resource is internal or external, e.g., if the resource depended on is inside or outside firewall. The dependency logic also includes a precondition, describing the circumstances in which a dependency between two resources will be found to exist. In addition, the dependency logic includes relaxation rules, which define how a dependency on a particular resource is to be relaxed for a particular current resource.

While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method of implementing a policy dealing with resource failure in a computer network, comprising the steps performed by a data processing system of:

receiving a failure event corresponding to a failure of a first network resource;

determining a second network resource that has a dependency relationship with the first network resource;

if the dependency relationship between the first and the second network resource is a relaxed dependency relationship, performing actions determined by a plurality of relaxation rules for the first and second network resources; and perform actions determined by a plurality of event handler rules for the failure event.

2. The method of claim 1, further comprising the step of:

performing the two performing steps only when if a dependency precondition for the first and second network resources evaluates to TRUE.

3. The method of claim 1, wherein the receiving step includes the step of:

receiving a failure event from an internal source.

4. The method of claim 1, wherein the receiving step includes the step of:

receiving a failure event from an external source.

5. The method of claim 1, wherein the determining step includes the step of determining a plurality of second network resources and an associated Boolean function, that define the dependency relationship with the first network resource.

6. The method of claim 5, further comprising:

if the dependency relationship between the first and the second network resource is a strong dependency relationships, omitting actions determined by the plurality of relaxation rules for the first and second network resources.

7. The method of claim 1, further comprising the step of:

determining whether a new internal failure event needs to be created; and creating the new internal failure event.

8. The method of claim 1, further comprising the step of:

requesting more information about the failure event.

9. The method of claim 1, wherein the first network resource has an associated status value.

10. The method of claim 9, wherein the step of performing action in accordance with event handler rules, includes:

changing the status of the first network resource in accordance with the event handler rules.

11. An apparatus that implements a policy for resource failure in a computer network, comprising:

means for receiving a failure event corresponding to a failure of a first network resource;

means for determining a second network resource that has a dependency relationship with the first network resource;

means for, if the dependency relationship between the first and the second network resource is a relaxed dependency relationship, performing actions determined by a plurality of relaxation rules for the first and second network resources; and means for performing actions determined by a plurality of event handler rules for the failure event.

12. An apparatus that implements a policy for resource failure in a computer network, comprising:

a portion configured to receive a failure event corresponding to a failure of a first network resource;

a portion configured to determine a second network resource that has a dependency relationship with the first network resource;

a portion configured, if the dependency relationship between the first and the second network resource is a relaxed dependency relationship, to perform actions determined by a plurality of relaxation rules for the first and second network resources; and a portion configured to perform actions determined by a plurality of event handler rules for the failure event.

13. The apparatus of claim 12, further comprising:

a portion configured to determine if a dependency precondition for the first and second network resources evaluates to TRUE and then to begin performing the actions determined by the plurality of relaxation rules.

14. The apparatus of claim 12, wherein the receiving portion includes:

a portion configured to receive a failure event from an internal source.

15. The apparatus of claim 12, wherein the receiving portion includes:

a portion configured to receive a failure event from an external source.

16. The apparatus of claim 12, wherein the determining portion includes a portion configured to determine a plurality of second network resources and an associated Boolean function, that define the dependency relationship with the first network resource.

17. The apparatus of claim 16, further comprising:

a portion configured, if the dependency relationship between the first and the second network resource is a strong dependency relationships, to omit actions determined by the plurality of relaxation rules for the first and second network resources.

18. The apparatus of claim 12, wherein the portion configured to perform an action in accordance with event handler rules includes:

a portion configured to change the status of the first network resource in accordance with the event handler rules.

19. A computer program product, comprising:

a computer usable medium having computer readable code embodied thereon for causing implementation of a policy dealing with resource failure in a computer network, the computer program product including:

computer readable program code devices configured to cause a computer to effect receiving a failure event corresponding to a failure of a first network resource;

computer readable program code devices configured to cause a computer to effect determining a second network resource that has a dependency relationship with the first network resource;

computer readable program code devices configured to cause a computer to effect, if the dependency relationship between the first and the second network resource is a relaxed dependency relationship, performing actions determined by a plurality of relaxation rules for the first and second network resources; and computer readable program code devices configured to cause a computer to effect performing actions determined by a plurality of event handler rules for the failure event.

20. A computer data signal embodied in a carrier wave and representing sequences of instructions which, when executed by a processor, cause implementation of a policy dealing with resource failure in a computer network, by performing the steps of:

executing a computer program to receive a failure event corresponding to a failure of a first network resource;

executing a computer program to determine a second network resource that has a dependency relationship with the first network resource;

executing a computer program, if the dependency relationship between the first and the second network resource is a relaxed dependency relationship, to perform actions determined by a plurality of relaxation rules for the first and second network resources; and executing a computer program to perform actions determined by a plurality of event handler rules for the failure event.

\* \* \* \* \*